April 19, 1955
F. S. BUTLER
2,706,569
ATTACHMENT FOR CONTROLLING RELATIVE
RAISING AND LOWERING OF HAND TRUCKS
Filed May 21, 1953
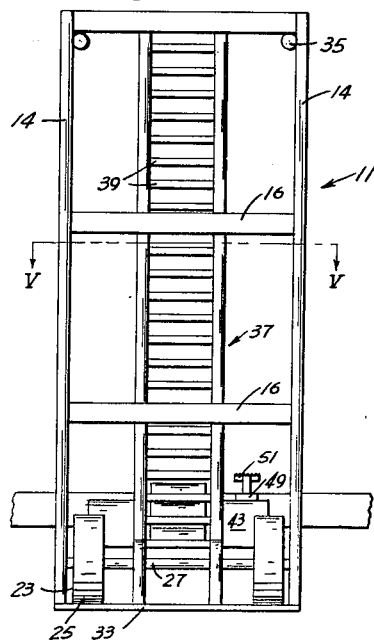
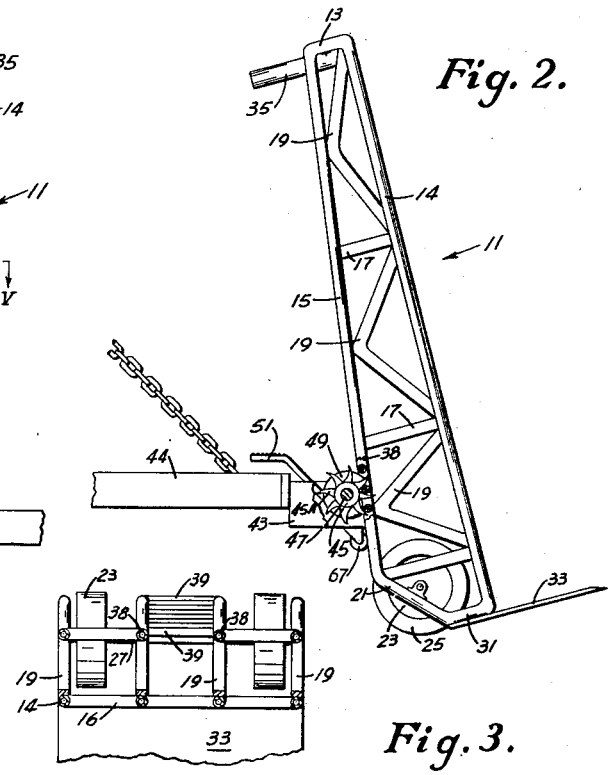
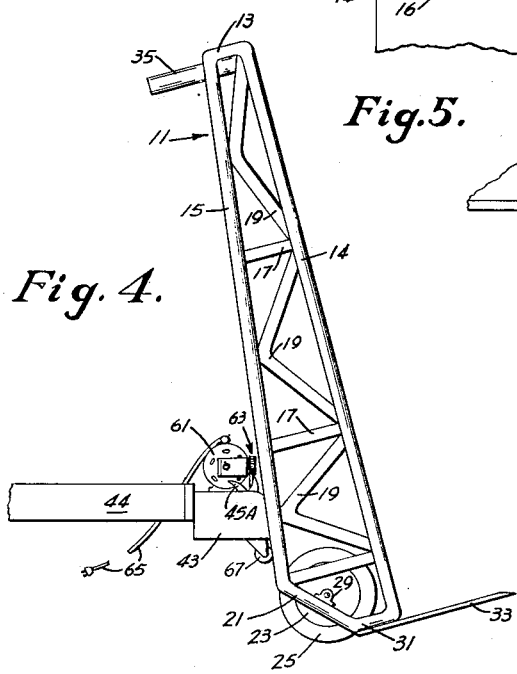
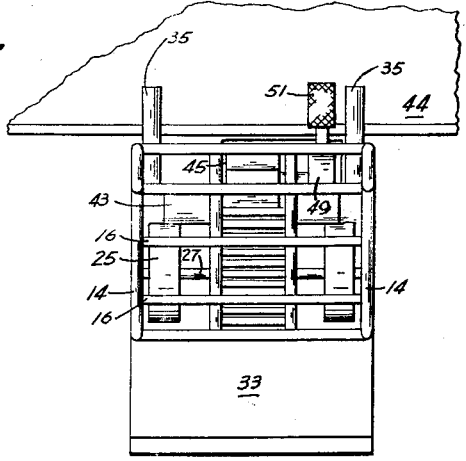
INVENTOR
FRAZIER S. BUTLER
BY
Weatherford and Weatherford
attys to the United States Patent Office 2,706,569
Patented Apr. 19, 1955

2,706,569

ATTACHMENT FOR CONTROLLING RELATIVE RAISING AND LOWERING OF HAND TRUCKS

Frazier S. Butler, Memphis, Tenn.

Application May 21, 1953, Serial No. 356,545

7 Claims. (Cl. 214—515)

This invention relates to a hand truck, and more specifically the invention relates to a hand truck adapted for safe and easy lowering and/or raising from or to an elevated platform, vehicle tail-gate, etc., by a cooperating mechanism mounted on the latter.

Specifically the invention relates to a hand truck and mechanism for safe and easy lowering and/or raising of said hand truck from and to an elevated platform, said mechanism being adapted for attachment to said platform adjacent an edge thereof and comprising a curved-toothed pinion and a brake and/or a motor for controlling rotation of said curved-toothed pinion, said hand truck including a ladder-like rack cooperating with said curved-toothed pinion for the lowering and/or raising operations.

While it has heretofore been proposed to provide means associated with a vehicle bed particularly for raising objects being loaded or unloaded, such means have been of complicated and expensive construction and difficult to use. The present invention overcomes these faults of the prior art devices.

A principal object of this invention is to provide a hand truck having a very simple and easy to use device for lowering and/or raising the same from or to a tail-gate or other elevated platform.

A further object is to provide a hand truck having a highly effective yet inexpensive device for lowering and/or raising the same from or to an elevated platform.

A further object of the invention is to provide a hand truck having a ladder-like rack attached thereto, a curved-toothed pinion attachable to a platform and engageable with said rack, and a foot-operated brake for controlling the rotation of said pinion and thereby the lowering of said hand truck.

A further object of the invention is to provide a hand truck that is easily maneuverable into engagement with a motor-driven device for raising and/or lowering the hand truck to or from a platform.

It is the overall object to generally improve the efficiency and design of hand trucks.

The means by which the foregoing and other objects of the present invention are accomplished and the manner of their accomplishment will be readily understood from the following specification upon reference to the accompanying drawings, in which:

Fig. 1 is a front elevational view of a hand truck and a brake-type lowering control means therefor, according to the present invention.

Fig. 2 is a side elevational view, partly in section, of the showing of Fig. 1.

Fig. 3 is a plan view of the disclosure of Fig. 1.

Fig. 4 is a side elevational view of a motor-driven modification of the invention for raising and/or lowering.

Fig. 5 is a sectional plan view of the hand truck taken as on the line V—V of Fig. 1.

Referring now to the drawings in which the various parts are indicated by numerals, the numeral 11 generally designates the hand truck, which basically includes substantially conventional construction. Hand truck 11 comprises a pair of parallel side truss-like frame members 13 comprising front and rear upright members 14, 15 interconnected by a plurality of transverse frame elements 16, preferably welded to front uprights 14. Each side frame member 13 is cross-braced by a plurality of spacing elements 17 and angularly disposed rigidifying elements 19. It is preferable that the frame elements of the hand truck be formed of metallic tubing for maximum strength and minimum weight. It will be seen that uprights 14, 15, preferably diverge from top to bottom.

Each side frame member 13 preferably has an angularly disposed portion 21 connected to the lower end of rear uprights 15 and extending forwardly and downwardly, as shown in Figs. 2 and 4, so as to provide means for supporting the wheels 23 which are thereby disposed so as to minimize extension of the wheels beyond the edges of said frame members. Wheels 23 may be of conventional construction, with or without rubber tires 25, and they are rotatably mounted on an axle 27 attached to the angularly disposed frame portions 21 by any suitable means such as bearing blocks 29.

Merging with the forward ends of sections 21 are frame sections 31 which are disposed substantially perpendicular to front uprights 15. To the undersides of sections 31 of frame members 13 is attached, by any suitable means as by welding, a substantially conventional tow-plate 33 by which the load is supported and carried in well known manner. Handles 35, of any desired construction and shape, are attached to frame members 13 adjacent their upper extremities.

Symmetrically located between and in parallelism to frame members 13 are a pair of frame members 37, which conveniently can be of a construction and size similar to the side frame members 13, previously described. Horizontally extending between and welded to the rear upright elements 38 of inner frame members 37, are a series of rung-like cross bars 39 which form a ladder or rack for cooperation with the pinion of the lowering mechanism next to be described.

The lowering mechanism comprises an elongated housing 43 adapted to be attached along and to the edge of a lowered tail gate 44 of a vehicle or the edge of any elevated platform or of a vehicle bed. The top surface of housing 43 is preferably flat so that it can form an extension of the surface of said platform bed, or tail gate, and the upright surface of the housing is disposed at a slight angle of tilt from the vertical. Medially of said housing 43 and toward its forward edge is located a pinion 45 lying mostly within the housing, but having its teeth extending in the forward pinion quadrant through a forward opening in the housing 43 so as to be engageable by the bars or "rungs" 39 of the ladder-like rack 38, 39 when the hand truck 11 is wheeled over the front edge of the housing 43 (Fig. 2). It should be noted that the teeth 45A of pinion 45 are curved or hooked and the curve is upward in the forward quadrant to prevent the rack 38, 39 from forwardly disengaging itself from the pinion 45. Pinion 45 is also preferably made almost as wide as the rack bars 39 for providing a good bearing therefor to prevent turning or tipping of the truck or lateral movement thereof.

Pinion 45 is keyed or otherwise fixed to a shaft 47 journalled in any suitable manner in the housing 43. To one side of pinion 45, and also fixed to the shaft 47, is a brake drum 49. Cooperating with brake drum 49 are one or a set of conventional brake shoes (not shown) which are preferably normally spring-pressed into braking engagement with said drum 49. Operatively connected to the brake shoes in well known manner is a foot pedal 51 pivotally attached to the lowering mechanism at a point laterally and rearwardly of the pinion for convenient engagement by the foot of the operator for release of the normally applied brakes. While the brake control is shown as a depressable foot pedal, it is apparent that the same could as well be a hand-operated device or a laterally movable pedal. Also the brake could be normally disengaged, instead of normally applied, if desired.

To lower the hand truck 11 the operator wheels the loaded hand truck 11 onto the top of housing 43, centering the rack 38, 39 over the pinion 45. As the wheels 23 of hand truck 11 start down over the front edge of the housing 43, the lowermost rung or bar 39 of rack 38, 39 engages in one of the curved teeth 45A of pinion 45, which, due to the normal braking condition, is held non-rotatable and the hand truck is stopped thereby in its descent. Still holding the handles 35 of the hand truck 11, the operator eases off the brake by slowly depressing pedal 51, permitting the pinion to be rotated under the weight of the hand truck supported thereon, so that the loaded truck is safely lowered to the ground, the ladder-like rack in effect "walking" downwardly with the pinion teeth successively engaging successive rungs 39. It will be observed that the descent of the hand truck may be interrupted at any point as desired by reapplying the brake, rendering the pinion non-rotatable.

In the modification of Fig. 4, the rotation of the pinion 45 is controlled or effected by an electric motor 61, preferably reversible, coupled to said pinion 45 by a gear train, schematically illustrated by the device generally designated as 63. The motor is connected in conventional manner by cable 65 to a source of power, not shown.

Motor 61 and gears 63 are preferably designed so as to serve (by internal friction and selected gear ratio) as an effective brake, so that the motor must be energized for either the lowering or the raising operation. Suitable foot- or hand-operated controls of conventional design (not shown) are employed to control the energization and reversing of the motor, as desired.

Due to the angle of inclination of the upright housing surface the hand truck, during movement relative to the vehicle, is maintained at an angle of tilt which promotes retention of load on the tow-plate.

In order to further stabilize the maintenance of the hand truck at an angle of tilt during such movement, it has been found desirable in some instances to provide the lower extremity of box 43 with a roller 67, which engages the uprights 38 and serves to further maintain the desired angle of tilt against horizontal tipping.

I claim:

1. In combination, a hand truck including a forward substantially upright load-engaging frame, a rear substantially upright frame connected to said forward frame, said forward frame diverging away from said rear frame to incline said forward frame relative to said rear frame for load retention, a vertically disposed rack member attached to and coplanar with the rear frame of said hand truck, a pinion having teeth adapted for meshing with the elements of said rack member, means for mounting said pinion adjacent the edge of an elevated platform or like structure for rotation about a substantially horizontal axis, and means associated with said pinion for controlling the rotation thereof, whereby said hand truck may be easily and safely lowered or raised by engagement of the teeth of said pinion with the elements of said rack member.

2. In combination, a hand truck including a forward substantially upright load-engaging frame, a rear substantially upright frame connected to said forward frame, said forward frame diverging away from said rear frame to incline said forward frame relative to said rear frame for load retention, a vertically disposed rack member attached to and coplanar with the rear frame of said hand truck, a pinion having teeth adapted for meshing with the elements of said rack member, means for mounting said pinion adjacent the edge of an elevated platform or like structure for rotation about a substantially horizontal axis, and means associated with said pinion for controlling the rotation thereof, whereby said hand truck may be easily and safely lowered by engagement of the teeth of said pinion with the elements of said rack member, said last mentioned means comprising a brake mechanism including a control device for varying the braking action of said mechanism.

3. In combination, a hand truck including a forward substantially upright load-engaging frame, a rear substantially upright frame connected to said forward frame, said forward frame diverging away from said rear frame to incline said forward frame relative to said rear frame for load retention, a vertically disposed rack member attached to and coplanar with the rear frame of said hand truck, a pinion having teeth adapted for meshing with the elements of said rack member, means for mounting said pinion adjacent the edge of an elevated platform or like structure for rotation about a substantially horizontal axis, and means associated with said pinion for controlling the rotation thereof, whereby said hand truck may be easily and safely lowered or raised by engagement of the teeth of said pinion with the elements of said rack member, said last mentioned means comprising a motor and means drivingly connecting said pinion to said motor for rotating the latter for raising or lowering of said hand truck by engagement of said rack member thereof with said pinion.

4. A hand truck comprising a pair of side frame members including rear members and front members diverging away from said rear members, transverse frame members connecting said side frame members to form a forward load-engaging frame, a second pair of substantially parallel frame members medially disposed between and coplanar with the rear members of said pair of side frame members, and a series of evenly spaced rung-like bars attached to said second pair of frame members to form a vertically disposed ladder-like rack for engagement with a pinion-like device for raising or lowering said hand truck to or from an elevated platform.

5. A hand truck according to claim 4, and in which said side members are truss-like frames formed of metallic tubing.

6. A device for lowering or raising a hand truck having a vertically disposed rack medially of the rear portion thereof, said device comprising a support adapted for attachment to the edge of a platform or the like, a substantially horizontally disposed shaft attached to said support, a pinion carried by said shaft for rotation about the axis thereof, said pinion having hook-shaped teeth whereby to prevent radial disengagement of rack elements therefrom, and means for controlling the rotation of said pinion for thereby controlling the raising or lowering action of said device.

7. A device for lowering or raising a hand truck having a vertically disposed rack medially of the rear portion thereof, said device comprising a support adapted for attachment to the edge of a platform or the like, a substantially horizontally disposed shaft attached to said support, a pinion carried by said shaft for rotation about the axis thereof, said pinion having hook-shaped teeth whereby to prevent radial disengagement of rack elements therefrom, and means for controlling the rotation of said pinion for thereby controlling the raising or lowering action of said device, said last mentioned means comprising a brake mechanism including a control device for varying the braking action of said mechanism.

References Cited in the file of this patent

UNITED STATES PATENTS

| 141,653 | Luehmann et al. | Aug. 12, 1873 |
| 619,774 | Morgan | Feb. 21, 1899 |
| 1,201,790 | Allen | Oct. 17, 1916 |
| 1,885,399 | Wren | Nov. 1, 1932 |
| 2,516,881 | Jarvis | Aug. 1, 1950 |
| 2,557,203 | Rehberger | June 19, 1951 |
| 2,598,489 | Bayer et al. | May 27, 1952 |

FOREIGN PATENTS

| 474,970 | Germany | Apr. 17, 1929 |